May 9, 1950     F. W. LEWIS     2,507,168

BRAKE BEAM WITH SAFETY HEAD RETAINER

Filed July 5, 1946

INVENTOR:
FRANK W. LEWIS

BY Rodney Bedell
ATTORNEY.

Patented May 9, 1950

2,507,168

UNITED STATES PATENT OFFICE 2,507,168

BRAKE BEAM WITH SAFETY HEAD RETAINER

Frank W. Lewis, Chicago, Ill., assignor to Chicago Railway Equipment Company, Chicago, Ill., a corporation of Illinois Application July 5, 1946, Serial No. 681,559

6 Claims. (Cl. 188—224.1)

1

The invention relates to railway brake beams of the truss type and consists in structure for maintaining the assembly of the compression member, the tension member and the brake head.

In a usual truss type brake beam, the head is seated on the end of the compression member and has a bearing on its outer face for a nut threaded on the end of the tension rod which passes through the brake head. If the nut works off or if the tension rod fails, the head may become disassembled from the compression and tension members. In such event, if the only support for the beam is the usual swing hanger received in the head, the beam may fall to the track and may cause serious damage to the truck and even wreck the train.

The main object of the invention is to maintain assembly of the beam in the event the tension rod or the nut fails.

It is a further object of the invention to provide a safety retainer for the head and other beam members which is simple, inexpensive and effective for the purpose indicated.

It is a further object to attain this result without perforating or distorting the metal of the beam compression and tension members.

These and other detail objects are attained by the structure illustrated in the accompanying drawings, in which.

Figure 2:
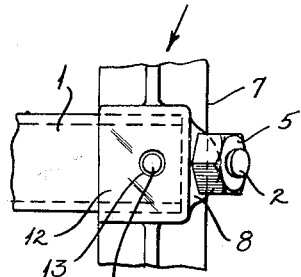
Figure 2 is a detail vertical view looking in the direction of the arrow 2 in Figure 1 showing the safety retainer applied and drawn to an enlarged scale.
Figure 4:
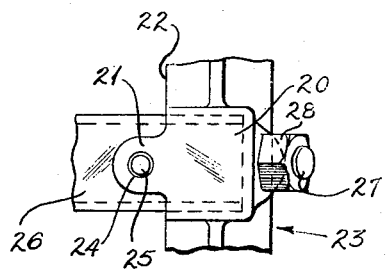
Figure 3:
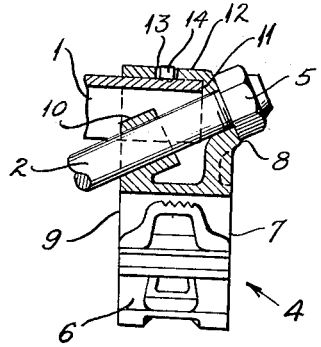
Figure 3 is a section corresponding to the right hand end of Figure 1 and drawn to an enlarged scale and showing the safety retainer applied.
Figure 5:
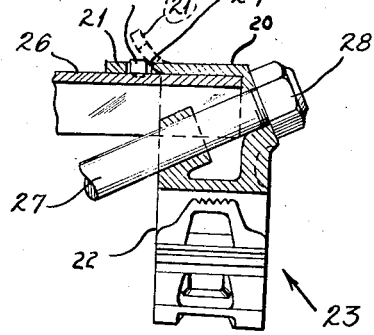

Figures 4 and 5 correspond to Figures 2 and 3 but show another form of the invention.

Figure 6:
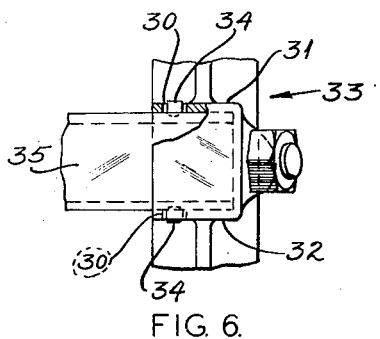

Figure 6 is a view similar to Figure 2, but sectioned in part, showing another embodiment of the invention.

Figure 1:
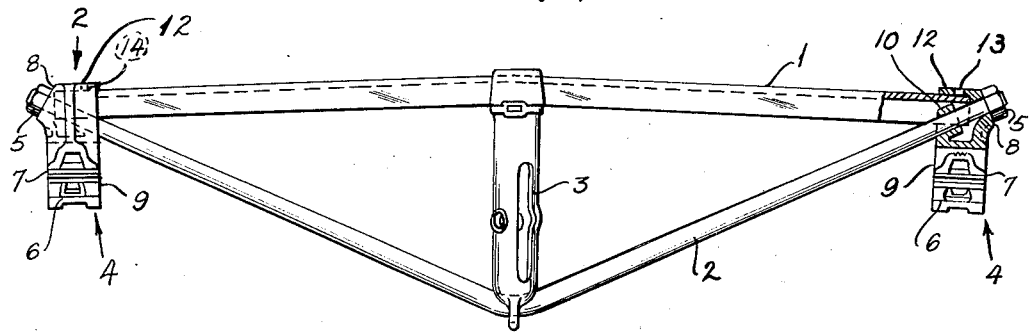
Figure 1 is a top view of a railway truss type brake beam embodying one form of the invention, the right hand end being sectioned and showing the parts before the safety retainer is applied.

The beam illustrated in Figures 1–3 includes a channel-shaped compression member 1, a round rod tension member 2, a strut 3 intermediate the ends of the beam, brake heads 4 mounted on the converging ends of the compression and tension members, and tensioning nuts 5 threaded on the ends of the tension member. Each head 4 includes the usual elements 6 facing forwardly of the beam to support the usual brake shoe (not shown). The outer side 7 of the head has

2 a bearing 8 for nut 5. The inner side 9 of the head preferably, but not necessarily, includes a sleeve 10 which encircles tension rod 2 and tends to limit play of tension rod relative to compression member 1. The head is recessed inwardly from its inner side 9 to receive the end portion of compression member 1 and the end of the latter is seated at 11.

All of the above described features correspond to well known structure. The head back wall 12 is provided with an aperture 13 positioned substantially centrally thereof. After the brake heads 4 are assembled with compression and tension members 1 and 2, a projection 14 is formed preferably by depositing weld material through aperture 13 onto the back of compression member 1 (Figures 2 and 3). This is done by electric welding, the compression member being one electrode and a rod or wire of the welding material being the other electrode. By touching the end of the rod to the compression member, a small deposit of the metal on the beam results and by repeated applications, the deposit is built up to the desired height. The projection formed thereby is of such size as to fit loosely in aperture 13 and is high enough to oppose the sides of aperture 13 to prevent withdrawal of head 4 from compression and tension members 1 and 2, irrespective of the presence of nut 5. Projection 14, during normal operation of the brake beam structure, does not engage the brake head and hence has no load or stress on it and is subject to stress only after removal of tensioning nut 5.

The structure shown in Figures 4 and 5 closely resembles that described above, but the back wall 20 of brake head 23 is provided with an integral lug 21 which extends inwardly from the end of the beam and projects beyond the inner side 22 of the brake head. Lug 21 has an aperture 24 loosely receiving a projection 25 formed on the back of compression member 26 as described above.

With this arrangement, if it is necessary to remove brake head 23 from compression member 26 and tension member 27, lug 21 can be bent rearwardly sufficiently to clear projection 25, as shown in broken lines in Figure 5, so that after removal of tensioning nut 28 from tension member 27, the brake head can be disassembled from the members.

Figure 6 shows a structure similar to Figures 1 to 3 except that apertures 30 are formed in top and bottom walls 31 and 32 of the member receiving pocket in brake head 33. Projections 34 are formed on top and bottom walls of compression member 35 through apertures 30 in the manner described above.

It will be understood that the safety retainers here illustrated are not intended to take the place of the tensioning nuts for resisting the thrusts exerted longitudinally of the beam when the brakes are applied and released but they will prevent the head from being disassembled accidentally from the remaining beam parts and the resultant dropping of the parts to the rail.

In the brake beam construction contemplated for use with the present invention, compression member 1 preferably is made of structural steel and brake heads 4 preferably are made of malleable iron castings. If the brake heads were welded directly to the compression member, as has been suggested by the prior art, or if the retaining lugs were welded to the heads, the malleable iron would be converted by the application of heat to brittle white iron. An advantage of the present invention is that weld material may be deposited through apertures 13 onto compression member 1 without changing the physical characteristics of the malleable iron of the brake heads. Furthermore, no strain is exerted on the weld material or on the brake heads adjacent thereto during normal operation of the brakes as would occur if the brake heads were welded rigidly to the compression member.

Details of construction may be varied substantially without departing from the spirit of the invention and the exclusive use of novel structure as described as coming within the scope of the claims is contemplated.

What is claimed is:

1. In a railway truss type brake beam including a compression member and a tension rod, a brake head member receiving the end portions of said compression member and said tension rod, and a device adjustably mounted on the end of the tension rod and thrusting the brake head member against the end of the compression member and holding the members assembled, one of said members having a rigid headless projection forming a shoulder facing in the general direction of thrust of said device, and the other of said members having an opening into which said projection is loosely received to form a safety stop preventing accidental disassembly of said members.

2. In a railway truss type brake beam including a compression member and a tension rod with their end portions converging, a brake head having a pocket receiving said end portions, a tensioning device adjustable lengthwise of said rod and holding the compression member and tension member in assembly, the brake head having a lug member extending along the compression member beyond the open end of said pocket, one of said members having an aperture, and the other of said members having a rigid projection loosely received in said aperture and preventing accidental disassembly of said brake head from the compression member and tension rod.

3. In a railway truss type brake beam including a compression member and a tension rod with their end portions converging, a brake head having a pocket receiving said end portions, a tensioning device adjustable lengthwise on said rod holding the compression member and tension member in assembly, said brake head having a lug provided with an aperture and extending along the compression member beyond the open end of the pocket, the compression member having a rigid projection loosely received in said aperture to hold the brake head against accidental removal from the tension rod and compression member.

4. A device as described in claim 3 in which the lug on the brake head is bendable upwardly to clear the projection to permit removal of the head from the tension rod and compression member.

5. In a railway truss type brake beam including a compression member and a tension rod with their end portions converging, a brake head having a pocket receiving said end portions, there being an aperture in the back wall of the brake head pocket, said compression member having an imperforate back web beneath said head with a rigid projection loosely received in said aperture and limiting movement of that head along the compression member.

6. In a railway truss type brake beam including a compression member and a tension member with their end portions converging, a brake head having a pocket receiving said end portions, and a device on the end of the tension member thrusting the brake head against the end of the compression member, there being apertures in the top and bottom walls of the brake head pocket and the compression member being imperforate within the brake head pocket and provided with rigid projections loosely received in said apertures to prevent accidental disassembly of the members.

FRANK W. LEWIS.

REFERENCES CITED

The following references are of record in the file of this patent:

UNITED STATES PATENTS

| Number | Name | Date |
| --- | --- | --- |
| 847,671 | Lindstrom | Mar. 19, 1907 |
| 1,296,651 | Gravell | Mar. 11, 1919 |
| 1,330,800 | Gravell | Feb. 17, 1920 |
| 2,348,100 | Wadsworth | May 2, 1944 |
| 2,408,015 | Busse | Sept. 24, 1946 |
| 2,419,115 | Busse | Apr. 15, 1947 |

FOREIGN PATENTS

| Number | Country | Date |
| --- | --- | --- |
| 18,397 | Great Britain | Aug. 26, 1903 |
| 197,321 | Canada | Nov. 3, 1919 |
| 546,807 | Great Britain | July 30, 1942 |